United States Patent
Scholl et al.

(10) Patent No.: US 6,521,684 B2
(45) Date of Patent: Feb. 18, 2003

(54) POLYETHER-CONTAINING RUBBER MIXTURES

(75) Inventors: Thomas Scholl, Gladbach (DE); Hermann-Josef Weidenhaupt, Pulheim (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/801,885

(22) Filed: Mar. 8, 2001

(65) Prior Publication Data

US 2001/0031822 A1 Oct. 18, 2001

(30) Foreign Application Priority Data

Mar. 15, 2000 (DE) .......................... 100 12 407

(51) Int. Cl.$^7$ ................................. C08K 5/06
(52) U.S. Cl. ..................................... 524/366
(58) Field of Search ......................... 524/366

(56) References Cited

U.S. PATENT DOCUMENTS

| | | | |
|---|---|---|---|
| 3,842,111 A | 10/1974 | Meyer-Simon et al. | 260/448.2 E |
| 3,978,103 A | 8/1976 | Meyer-Simon et al. | 260/448.8 R |
| 4,182,898 A * | 1/1980 | Fujiwara | 560/26 |
| 4,539,367 A * | 9/1985 | Beers | 524/731 |
| 4,709,065 A | 11/1987 | Yoshioka et al. | 556/428 |
| 4,929,769 A * | 5/1990 | Anderson | 568/614 |
| 5,070,150 A | 12/1991 | Hopper | 525/350 |
| 5,663,226 A | 9/1997 | Scholl et al. | 524/262 |
| 5,703,151 A | 12/1997 | Yamamoto et al. | 524/262 |
| 5,717,022 A | 2/1998 | Beckmann et al. | 524/493 |
| 6,130,277 A | 10/2000 | Okamura et al. | 524/306 |
| 6,251,976 B1 | 6/2001 | Scholl et al. | 524/386 |
| 6,268,421 B1 | 7/2001 | Dittrich et al. | 524/266 |

FOREIGN PATENT DOCUMENTS

| | | |
|---|---|---|
| CA | 2186060 | 3/1997 |
| DE | 19832549 | 2/2000 |
| DE | 19914848 | 10/2000 |
| DE | 19920 788 | 11/2000 |
| GB | 1439247 | 11/1973 |
| GB | 1575115 | 9/1980 |

OTHER PUBLICATIONS

Houben–Weyl, Methoden der Organischen Chemie, vol. XIV/2, (month unavailable), 1963, pp. 436–440 and 450.

* cited by examiner

*Primary Examiner*—Edward J. Cain
(74) *Attorney, Agent, or Firm*—Joseph C. Gil; Noland J. Cheung; Jennifer R. Seng

(57) ABSTRACT

The present invention provides rubber mixtures with improved processing behavior containing special polyethers and use of the rubber mixtures for preparing vulcanizates, in particular for the production of highly reinforced, abrasion-resistant molded items, particularly preferably for producing tires which have a low rolling resistance and a high abrasion resistance.

11 Claims, No Drawings

POLYETHER-CONTAINING RUBBER MIXTURES

FIELD OF THE INVENTION

The present invention provides rubber mixtures with improved processing behavior containing special polyethers and use of the rubber mixtures for preparing vulcanizates, in particular for the production of highly reinforced, abrasion-resistant molded items, preferably for producing tires which have a low rolling resistance and a high abrasion resistance.

BACKGROUND OF THE INVENTION

A number of solutions have been put forward for producing tires with low rolling resistance. Certain polysulfidic silanes are described in DE-A-2 255 577 and 4 435 311. EP-A1-0 670 347 and U.S. Pat. No. 4,709,065 as reinforcement additives for silica-containing rubber vulcanizates. The disadvantage of using the polysulfidic silanes described in those patents as reinforcement additives for silica-containing rubber vulcanizates, however, is that relatively large amounts of the expensive polysulfidic sulfides are required in order to achieve acceptable processability.

To improve the processability of silica-containing rubber mixtures, other additives have been suggested such as esters of fatty acids, salts of fatty acids or mineral oils. The additives mentioned have the disadvantage that they increase the ability to flow, but also reduce the modulus at high extensions (e.g., 100 to 300%) so that the reinforcing effect of the filler suffers a decrease.

In addition, it is known that polyalcohols and polyglycols can be added to rubber mixtures. Thus, EP-A1-0 869 145 and EP-A1-0 738 755 describe rubber mixtures which contain certain polyethylene oxides. The special structures of the polyethers according to the present invention were not disclosed. According to the disclosure in these documents, the polyethylene oxides mentioned barely improve the processability of the unvulcanized rubber mixtures at all but act mainly on the vulcanizate properties, in particular on the antistatic properties and on the abrasive behavior.

SUMMARY OF THE INVENTION

Thus, the object of the invention was to provide additives, which improve the ability of rubber mixtures to flow and yield vulcanizates with improved properties, in particular with respect to abrasion, rolling resistance and wet skid resistance in the case of tires.

Special polyethers were found which, surprisingly, clearly improve the ability of rubber mixtures to flow and lead to vulcanizates with good reinforcement characteristics, favorable dynamic damping and good abrasion characteristics.

Therefore, the present invention provides rubber mixtures containing in the range from 0.05 to 25 parts by wt., with respect to 100 parts by wt. of the total amount of rubber used, of a polyether of the structure (I)

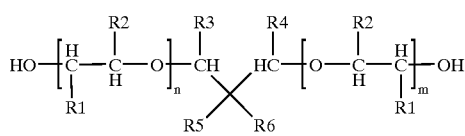

in which $R^1$ and $R^2$, independently, represent hydrogen or a $C_1$ to $C_4$ alkyl group and $R^3$ and $R^4$, independently, represent hydrogen or a $C_1$ to $C_6$ alkyl group and $R^5$ and $R^6$, independently, represent hydrogen, a $C_1$ to $C_{18}$ alkyl group, a $C_7$ to $C_{22}$ alkylaryl group, a $C_7$ to $C_{22}$ arylalkyl group, the group —$CH_2$—OH or the group —$CHR^4$—(—O—$CHR^1$—$CHR^2$—)$_m$—OH, with the condition that at least one of the groups $R^5$ and $R^6$ is a $C_1$ to $C_{18}$ alkyl group, a $C_7$ to $C_{22}$ alkylaryl group or a $C_7$ to $C_{22}$ arylalkyl group, and n and m, independently, represent integers from 1 to 10, preferably 1 to 5, and also in the range from 1 to 500 parts by wt. of filler and optionally other rubber auxiliary substances and/or cross-linking agents.

DETAILED DESCRIPTION OF THE INVENTION

Preferred representatives of polyethers (I) are addition and polyaddition compounds of neopentyl glycol or trimethylolpropane within the range from 0.7 to 10 mol of ethylene oxide and/or propylene oxide per hydroxyl group with molecular weights in the range from 192 to 1,500, preferably in the range from 192 to about 700. The addition and polyaddition compounds of in the range from 0.7 to 7 mol of ethylene oxide and/or propylene oxide per mol of hydroxyl groups in neopentyl glycol or trimethylolpropane are preferred, and the corresponding addition and polyaddition products of in the range from 0.7 to 3 mol of ethylene oxide and/or propylene oxide per hydroxyl group in trimethylolpropane are most preferred.

The preparation of these types of addition and polyaddition products is part of the prior art (Houben-Weyl, Methoden der organischen Chemie, vol. XIV/2, Thieme Verlag, Stuttgart, 1963, pages 436–440, 450). These types of polyethers are also commercially available. Suitable polyethers are, for example, Desmophene® 550 U and Desmophen® 4011 T from Bayer AG. The polyethylene oxides and polypropylene oxides or their mixed polyethers are preferably used as mixtures due to the method of preparation.

An amount in the range from 0.3 to 15 parts by wt., preferably 1 to 10 parts by wt., with respect to 100 parts by wt. of the total amount of rubber used, of polyether (I) is added to rubber mixtures according to the present invention.

The rubbers to be used to prepare rubber mixtures according to the present invention include natural rubber and synthetic rubbers. Preferred synthetic rubbers are described, for example, in W. Hofmann, Kautschuktechnolgie, Genter Verlag, Stuttgart, 1980. They include, inter alia, BR polybutadiene
ABR butadiene/$C_1$–$C_4$-alkyl acrylate copolymers
CR polychloroprene
IR polyisoprene
SBR styrene/butadiene copolymers with styrene contents in the range from 1–60, preferably in the range from 20–50, wt. %
IIR isobutylene/isoprene copolymers
NBR butadiene/acrylonitrile copolymers with acrylonitrile contents in the range from 5–60, preferably in the range from 10–40, wt. %
HNBR partly hydrogenated or fully hydrogenated NBR rubbers
EPDM ethylene/propylene/diene copolymers
and mixtures of these rubbers.

Mixtures of natural rubber, emulsion SBR and solution SBR and polybutadiene rubbers are important for the production of motor vehicle tires. Of particular interest for use in rubber mixtures according to the present invention is the use of solution SBR rubbers with a vinyl content in the range from 20–60 wt. % and of polybutadiene rubbers with a high 1,4-cis content (>90%), which have been prepared with catalysts based on nickel, cobalt, titanium and/or neodymium, and also polybutadiene rubbers with a vinyl content of up to 75% and mixtures of the solution SBR and polybutadiene rubbers mentioned. Most preferred are the corresponding solution SBR and polybutadiene rubbers with an additional concentration of bonded functional groups, in particular hydroxyl and/or carboxyl groups. Preferred concentrations of hydroxyl and/or carboxyl groups are in the range from 0.05 to 3 wt. %, with respect to the rubber. Most preferred rubbers according to the present invention are described, for example, in German patent applications DE-A1-198, 32 549, DE-A1-198 52 648, DE-A1-1 99 14 848, DE-A1-199 20 788, DE-A1-199 20 814 and DE-A2.653.144 and EP-A1-0 464 478, which are included in the application, as reference material, for US practice.

Rubber mixtures according to the present invention can contain in the range from 0.1 to 300 parts by wt. of a wide variety of fillers, with respect to 100 parts by wt. of the total amount of rubber. Suitable fillers are mainly oxidic and/or silicate fillers and/or carbon black. Oxidic and/or silicate fillers are preferred.

The following are most preferred:

highly dispersed silica, prepared, for example, by precipitation from solutions of silicates or flame hydrolysis of silicon halides with specific surface areas in the range from 5 to 1000, preferably in the range from 20–400 m$^2$/g (BET surface area) and with primary particle sizes in the range from 10–400 nm. The silicas can optionally also be present as mixed oxides with other metal oxides such as Al, Mg, Ca, Ba, Zn, Zr, Ti, oxides.

synthetic silicates such as aluminum silicate, alkaline earth silicates such as magnesium silicate or calcium silicate, with BET surface areas in the range from 20–400 m$^2$/g and primary particle diameters in the range from 10–400 nm.

natural silicates such as kaolin and other naturally occurring silicas.

glass fibers and glass fiber products (mats, ropes) or glass microbeads.

metal oxides such as zinc oxide, calcium oxide, magnesium oxide, aluminum oxide.

metal carbonates such as magnesium carbonate, calcium carbonate, zinc carbonate.

metal hydroxides such as aluminum hydroxide, magnesium hydroxide.

The fillers mentioned are preferably used in amounts in the range from 5 to 200 parts by wt., more preferably in the range from 10 to 150 parts by wt., with respect to 100 parts by wt. of the rubber used.

As mentioned, carbon blacks are also suitable as fillers. They are prepared by the lamp black, furnace black or channel black process and generally have BET surface areas of 20 to 200 m$^2$/g, such as SAF, ISAF, HAF, FEF or GPF carbon blacks.

In a most preferred embodiment, rubber mixtures according to the present invention comprise, in addition to at least one rubber, of from 0.5 to 10 parts by wt. of polyhydroxyl compound (I), from 10 to 100 parts by wt. of oxidic or silicate fillers and from 5 to 50 parts by wt. of carbon black, each with respect to 100 parts by wt. of the rubber used.

To prepare rubber vulcanizates, known and conventionally used rubber auxiliary products may be added to rubber mixtures according to the present invention, in particular vulcanization accelerators, antioxidants, heat stabilizers, light protection agents, anti-ozone agents, processing auxiliary substances, plasticizers, tackifiers, blowing agents, colorants, pigments, waxes, extenders, organic acids, delayers, metal oxides, cross-linking agents and activators, In this connection, reference is made to I. Franta, Elastomers and Rubber Compounding Materials, Elsevier 1989, p. 325–494.

The rubber auxiliary agents are used in conventional amounts, which are governed, inter alia, by the ultimate use. Conventional amounts are in the range from 0.1–50 wt. %, with respect to the total amount of rubber used.

In addition, known cross-linking agents such as sulfur, sulfur donors or peroxides can also be used during preparation of the rubber vulcanizates. In addition, vulcanization accelerators such as mercapto-benzthiazoles, guanidines, thiurams, dithiocarbamates, thioureas and/or thiocarbonates may obviously also be added to rubber mixtures according to the present invention. Vulcanization accelerators and cross-linking agents are used in amounts in the range from 0.1–10 wt. %, preferably in the range from 0.1 to 5 wt. %, with respect to the total amount of rubber used.

In a preferred embodiment, rubber mixtures according to the present invention also contain, in addition to the rubbers mentioned, fillers, polyethers (I), rubber auxiliary agents and cross-linking agents, in the range from 0.2 to 4 parts by wt. of zinc salts of aliphatic, cycloaliphatic and/or aromatic $C_6$–$C_{36}$ carboxylic acids, e.g. zinc salts of tallow fatty acid, oleic acid or benzoic acid. In addition, in the most preferred embodiment, in the range from 0.5 to 15 parts by wt., with respect to 100 parts by wt. of rubber used, of sulfur-containing silyl ethers are also added as filler activators, in particular bis-(trialkoxysilyl-alkyl)-polysulfides as described in DE-A-2 141 159 and DE-A-2 255 577, oligomeric and/or polymeric sulfur-containing silyl ethers as described in DE-A-4 425 311 and EP-A1-0 670 347 and also mercapto.-alkyltrialkoxysilanes, mercaptopropyltriethoxysilane and/or thiocyanatoalkylsilyl ethers as described in DE-A-1 95 44 469.

Rubber mixtures according to the present invention can be prepared using conventional equipment such as mixing units, in particular rollers, internal mixers and mixer-extruders.

Vulcanization of rubber mixtures according to the present invention can be performed conventionally at temperatures in the range from 100 to 200° C., preferably in the range from 130 to 180° C., optionally at pressures in the range from 10 to 200 bar.

Rubber mixtures containing polyethers (I) according to the present invention are characterized, in particular, by a particularly high ability to flow, high processing reliability, and improved vulcanization kinetics and provide vulcanizates with relatively high values for the modulus. They are, therefore, suitable in particular for the cost-effective production of highly reinforced, abrasion-resistant molded items.

The following may be mentioned, in particular, as molded items: cable sheathing, hoses, drive belts, conveyer belts, roller coverings, tires, soles of shoes, sealing rings and damping elements. Most preferred is the use of rubber mixtures according to the present invention for the production of tire treads with low rolling resistance.

The invention is further illustrated but is not intended to be limited by the following examples in which all parts and percentages are by weight unless otherwise specified.

EXAMPLES

The polyethers can be prepared from the corresponding alcohols or phenols in accordance with Houben-Weyl, Methoden der organischen Chemie, vol. XIV/2, Thieme Verlag, Stuttgart, 1963, pages 463–440, 450. The data relating to amounts is given as parts by weight. The Mooney measurements were performed as described in DIN 53 523.

Examples 1–9

The following rubber mixtures were prepared in a 300 ml internal mixer (35 rpm, start temperature 120° C., 5 minutes mixing time). Adducts of trimethylolpropane and ethylene oxide (1.3, 2.5 and 4 mol of ethylene oxide per hydroxyl group equivalent) and also of trimethylolpropane and propylene oxide (1 mol of propylene oxide per hydroxyl group equivalent), as polyethers according to the present invention, were compared with various polyethers from the prior art.

TABLE 1

|  | Comparison examples | | | | | Examples | | | |
|---|---|---|---|---|---|---|---|---|---|
|  | 1 | 2 | 3 | 4 | 5 | 6 | 7 | 8 | 9 |
| S-SBR Buna ® VSL 5025-1 (oil-extended rubber from Bayer AG) | 137.5 | 137.5 | 137.5 | 137.5 | 137.5 | 137.5 | 137.5 | 137.5 | 137.5 |
| Vulkasil ® S (precipitated silica from Bayer AG) | 80 | 80 | 80 | 80 | 80 | 80 | 80 | 80 | 80 |
| Enerthene 1849-1 (aromatic mineral oil from BP) | 37.5 | 37.5 | 37.5 | 37.5 | 37.5 | 37.5 | 37.5 | 37.5 | 37.5 |
| ZnO (Bayer AG) | 2.5 | 2.5 | 2.5 | 2.5 | 2.5 | 2.5 | 2.5 | 2.5 | 2.5 |
| Stearic acid | 1 | 1 | 1 | 1 | 1 | 1 | 1 | 1 | 1 |
| Vulkanox ® 4020 (Bayer AG) | 1 | 1 | 1 | 1 | 1 | 1 | 1 | 1 | 1 |
| polyethoxylated lauryl alcohol (with 7 mol ethylene oxide per hydroxyl equivalent) | 0 | 4 | 0 | 0 | 0 | 0 | 0 | 0 | 0 |
| polyethoxylated oleic acid (with 6.5 mol ethylene oxide per carboxyl equivalent) | 0 | 0 | 4 | 0 | 0 | 0 | 0 | 0 | 0 |
| octaethylene glycol | 0 | 0 | 0 | 4 | 0 | 0 | 0 | 0 | 0 |
| polyethylene glycol (M. wt. 400)-bis-octanoate (in accordance with EP-A1-0 869 145 compound no. 2) | 0 | 0 | 0 | 0 | 4 | 0 | 0 | 0 | 0 |
| polyethoxylated trimethylolpropane (1.3 mol ethylene oxide per hydroxyl equivalent) | 0 | 0 | 0 | 0 | 0 | 4 | 0 | 0 | 0 |
| polyethoxylated trimethylolpropane (2.5 mol ethylene oxide per hydroxyl equivalent) | 0 | 0 | 0 | 0 | 0 | 0 | 4 | 0 | 0 |
| polyethoxylated trimethylolpropane (4 mol ethylene oxide per hydroxyl equivalent) | 0 | 0 | 0 | 0 | 0 | 0 | 0 | 4 | 0 |
| polypropoxylated trimethylolpropane (1 mol propylene oxide per hydroxyl equivalent) | 0 | 0 | 0 | 0 | 0 | 0 | 0 | 0 | 4 |
| Mixing viscosities ML 1 + 4 at 100° C. | 160 | >200 | >200 | 141 | >200 | 129 | 129 | 129 | 123 |

Examples 10–15

The following rubber mixtures were prepared in a 300 ml internal mixer (55 rpm, start temperature 100° C., 7 minutes mixing time, final temperature 130° C.). The hydroxyl-S-SBR rubber used was obtained in accordance with EP-A1-0 974 616 by reacting 100 parts by wt. of solution SBR Buna® VSL 5020-0 with 2 parts by wt. of mercaptoethanol and 0.233 parts by wt. of dilauryl peroxide at 80° C. in cyclohexane and extended with 37.5 parts by wt. of aromatic mineral oil Mobilsol K (from Mobil Oil). The composition of the mixture and the results are given in Table 2:

TABLE 2

|  | Comparison examples | | | | Examples | |
|---|---|---|---|---|---|---|
|  | 10 | 11 | 12 | 13 | 14 | 15 |
| Hydroxyl-S-SBR (0.4% OH, 37.5 phr oil content) | 54 | 54 | 54 | 54 | 54 | 54 |
| Buna ® CB 24 | 45 | 45 | 45 | 45 | 45 | 45 |
| Natural rubber TSR 5* | 10 | 10 | 10 | 10 | 10 | 10 |
| Vulkasil ® S | 70 | 70 | 70 | 70 | 70 | 70 |
| Enerthene 1849-1 | 28.5 | 28.5 | 28.5 | 28.5 | 28.5 | 28.5 |
| ZnO | 2.5 | 2.5 | 2.5 | 2.5 | 2.5 | 2.5 |
| Stearic acid | 1 | 1 | 1 | 1 | 1 | 1 |

TABLE 2-continued

|  | Comparison examples | | | | Examples | |
|---|---|---|---|---|---|---|
|  | 10 | 11 | 12 | 13 | 14 | 15 |
| Vulkanox ® 4020 (Bayer AG) | 1.5 | 1.5 | 1.5 | 1.5 | 1.5 | 1.5 |
| Silane Si 69 (Degussa AG) | 5.6 | 5.6 | 5.6 | 5.6 | 5.6 | 5.6 |

E.g., obtainable from Weber & Schaer, 20095 Hamburg
The following compounds were then admixed on a rubber roller (50° C.):

| no additives | 0 | 0 | 0 | 0 | 0 | 0 |
|---|---|---|---|---|---|---|
| polyethoxylated lauryl alcohol (7 mol ethylene oxide/OH) | 0 | 4 | 0 | 0 | 0 | 0 |
| polyethoxylated nonyl phenol (12 mol ethylene oxide/OH) | 0 | 0 | 4 | 0 | 0 | 0 |

TABLE 2-continued

|  | Comparison examples | | | | Examples | |
| --- | --- | --- | --- | --- | --- | --- |
|  | 10 | 11 | 12 | 13 | 14 | 15 |
| polyethoxylated oleic acid (6.5 mol ethylene oxide/COOH) | 0 | 0 | 0 | 4 | 0 | 0 |
| ethoxylated trimethylolpropane (2.4 mol ethylene oxide/OH) | 0 | 0 | 0 | 0 | 4 | 0 |
| propoxylated trimethylolpropane (7 mol propylene oxide/OH) | 0 | 0 | 0 | 0 | 0 | 4 |
| The resulting rubber mixtures had the following viscosities: ML 1 + 4 (100° C.) | 118 | 111 | 115 | 117 | 94 | 100 |

The mixture viscosities determined show that conventional polyethylene oxide polyethers have virtually no viscosity-lowering effect and that polyethers according to the invention occupy a special position here and are considerably more effective flow promoting agents.

Examples 16–19

The following rubber mixtures were prepared in a 1.5 l internal mixer (70 rpm, start temperature 80° C., final temperature 140° C.). The hydroxyl-S-SBR-rubber used was obtained in accordance with EP-A1-0 974 616 by reacting 100 parts by wt. of solution SBR Buna VSL 5025-0 with 1,15 parts by wt. mercaptoethanol and 0,15 parts by wt. Trigonox 29-C50 (50 wt. % solution of 1.1-(Di(tert.butylperoxi)-3,3,5-trimethylcyclohexane in hydrocarbon, supplier: Akzo Nobel Chemicals GmbH) at 110° C. and extended with 21 parts by wt. of aromatic mineral oil Mobilsol K (from Mobil Oil). The composition of the mixtures and the results are given in table 3. Polypropyleneglycolpolyether with molecular weight 1.000 (comparison polyether B) and a polyfunctional, from Sorbit started polypropyleneglycol (comparison polyether C) were used as comparison compounds:

TABLE 3

|  | Comparison Examples | | | Example |
| --- | --- | --- | --- | --- |
|  | 16 | 17 | 18 | 19 |
| Hydroxyl-L-SBR (0.25% OH, 21 phr oil content) | 91 | 91 | 91 | 91 |
| Buna CB 25 (Bayer AG) | 30 | 30 | 30 | 30 |
| mineral oil Enerthe 1849-1 (BP) | 16.5 | 16.5 | 16.5 | 16.5 |
| silica Vulkasil S (Bayer AG) | 80 | 80 | 80 | 80 |
| zinc oxide | 2.5 | 2.5 | 2.5 | 2.5 |
| silane Si 69 (Degussa Hüls AG) | 6.4 | 6.4 | 6.4 | 6.4 |
| wax Antilux 654 (Rheinchemie) | 1.5 | 1.5 | 1.5 | 1.5 |
| stearic acid | 1 | 1 | 1 | 1 |
| Vulkanox 4020 (Bayer AG) | 1 | 1 | 1 | 1 |
| comparison polyether B | 0 | 8 | 0 | 0 |
| comparison polyether C | 0 | 0 | 8 | 0 |
| polyether acc. to this invention (ethoxilated trimethyolpropane, MG 310) accelerator Vulkacit CZ (Bayer AG) | 0 1.8 | 0 1.8 | 0 1.8 | 8 1.8 |
| accelerator Vulkacit D (Bayer AG) | 2 | 2 | 2 | 2 |
| sulfur | 1.5 | 1.5 | 1.5 | 1.5 |
| compound viscosity ML 1 + 4 (100° C.) | 110 | 117 | 126 | 88 |

Extrusion performance: The rubber mixtures were extruded at 90° C. using a flat trapezoidal shaped nozzle (maximum height 4 mm, 50 mm width) at 1,4 ccm/sec. Extrudate appearance:

comparison examples 3.A, 3.B and 3.C: jagged border, rough uneven surface
example 3.1: smooth border, smooth uniform surface The rubber mixtures were vulcanised at 170° C. for 20 minutes. The following vulcanisate properties were obtained:

TABLE 3

(continued)

|  | 16 | 17 | 18 | 19 |
| --- | --- | --- | --- | --- |
| tensile strength (Mpa) | 17.6 | 16 | 16.3 | 19.9 |
| elongation at break (%) | 365 | 440 | 425 | 455 |
| stress at 300% elongation (MPA) | 13.3 | 9.4 | 10.4 | 11.5 |
| hardness at 23° C. (Shore A) | 66 | 66 | 68 | 69 |
| rebound elasticity at 70° C. (%) | 57 | 57 | 56 | 58 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber mixtures comprising from 0.05 to 25 parts by wt. with respect to 100 parts by wt. of the total amount of rubber used, of the following polyether

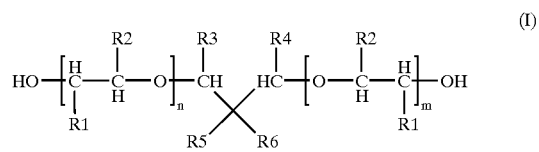

(I)

in which $R^1$ and $R^2$, independently, represent hydrogen or a $C_1$ to $C_4$ alkyl group; and $R^3$ and $R^4$, independently, represent hydrogen or a $C_1$ to $C_6$ alkyl group; and $R^5$ and $R^6$, independently, represent hydrogen, a $C_1$ to $C_{18}$ alkyl group, a $C_7$ to $C_{22}$ alkylaryl group, a $C_7$ to $C_{22}$ arylalkyl group, the group —$CH_2$—OH or the group —$CHR^4$—(—O—$CHR^1$—$CHR^2$—$)_m$—OH, with the condition that at least one of the groups $R^5$ and $R^6$ is a $C_1$ to $C_{18}$ alkyl group, a $C_7$ to $C_{22}$ alkylaryl group or a $C_7$ to $C_{22}$ arylalkyl group; and n and m, independently, represent integers from 1 to 10, and also from 1 to 500 parts by wt. of filler and optionally other rubber auxiliary substances and/or cross-linking agents.

2. Rubber mixtures according to claim 1, wherein said rubber mixture comprises from 0.1 to 300 parts by wt. of inorganic and/or organic fillers, with respect to 100 parts by wt. of rubber used.

3. Rubber mixtures according to claim 1, wherein said fillers are selected from the group consisting of oxidic or silicate fillers and carbon black or mixtures of these.

4. Rubber mixtures according to claim 3, wherein said filler comprises one or more precipitated silicas and/or precipitated silicates with a specific surface area of 20 to 400 $m^2/g$ or a mixture thereof.

5. Rubber mixtures comprising from 0.3 to 15 parts by wt. of an addition and polyaddition compound of 0.7 to 7 mol of ethylene oxide and/or propylene oxide per mol of hydroxyl groups in neopentyl glycol and/or trimethylolpropane, with respect to 100 parts by wt. of the total amount of rubber used.

6. Vulcanizates comprising rubber mixtures comprising from 0.05 to 25 parts by wt. with respect to 100 parts by wt. of the total amount of rubber used, of the following polyether

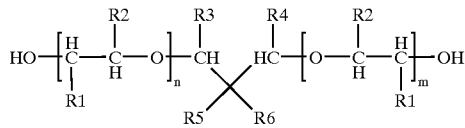
(I)

in which
- $R^1$ and $R^2$, independently, represent hydrogen or a $C_1$ to $C_4$ alkyl group; and
- $R^3$ and $R^4$, independently, represent hydrogen or a $C_1$ to $C_6$ alkyl group; and
- $R^5$ and $R^6$, independently, represent hydrogen, a $C_1$ to $C_{18}$ alkyl group, a $C_7$ to $C_{22}$ alkylaryl group, a $C_7$ to $C_{22}$ arylalkyl group, the group —$CH_2$—OH or the group —$CHR^4$—(—O—$CHR^1$—$CHR^2$—)$_m$—OH, with the condition that at least one of the groups $R^5$ and $R^6$ is a $C_1$ to $C_{18}$ alkyl group, a $C_7$ to $C_{22}$ alkylaryl group or a $C_7$ to $C_{22}$ arylalkyl group; and
- n and m, independently, represent integers from 1 to 10, and also from 1 to 500 parts by wt. of filler and optionally other rubber auxiliary substances and/or cross-linking agents.

7. Vulcanizates according to claim 6, wherein said rubber mixture comprises from 0.1 to 300 parts by wt. of inorganic and/or organic fillers, with respect to 100 parts by wt. of rubber used.

8. Vulcanizates according to claim 6, wherein said fillers are selected from the group consisting of oxidic or silicate fillers and carbon black or mixtures of these.

9. Vulcanizates according to claim 8, wherein said filler comprises one or more precipitated silicas and/or precipitated silicates with a specific surface area of 20 to 400 m²/g or a mixture thereof.

10. A vulcanizate according to claim 6, wherein said vulcanizate is a tire.

11. A vulcanizate according to claim 6, wherein said vulcanizate is a tire tread.

* * * * *